United States Patent [19]

Hall

[11] 4,126,123

[45] Nov. 21, 1978

[54] SOLAR ENERGY COLLECTOR INCLUDING A WEIGHTLESS BALLOON WITH SUN TRACKING MEANS

[76] Inventor: Frederick F. Hall, 2452 Villaneuva Way, Mountain View, Calif. 94040

[21] Appl. No.: 767,121

[22] Filed: Feb. 24, 1977

[51] Int. Cl.² .............................................. F24J 3/02
[52] U.S. Cl. ..................................... 126/271; 126/270
[58] Field of Search ................ 126/270, 271; 237/1 A

[56] References Cited

U.S. PATENT DOCUMENTS

| | | | |
|---|---|---|---|
| 3,125,091 | 3/1964 | Sleeper, Jr. .................... | 126/271 |
| 4,034,737 | 7/1977 | Kume ............................. | 126/271 |
| 4,048,983 | 9/1977 | Pei ................................. | 126/271 |

*Primary Examiner*—Kenneth W. Sprague
*Attorney, Agent, or Firm*—Finnegan, Henderson, Farabow & Garrett

[57] ABSTRACT

A solar energy collector having a weightless balloon, the balloon including a transparent polyvinylfluoride hemisphere reinforced with a mesh of ropes secured to its outside surface, and a laminated reflector hemisphere, the inner layer being clear and aluminized on its outside surface and the outer layer being opaque, the balloon being inflated with lighter-than-air gas. A heat collection probe extends into the balloon along the focus of reflection of the reflective hemisphere for conducting coolant into and out of the balloon. The probe is mounted on apparatus for keeping the probe aligned with the sun's path, the apparatus being founded in the earth for withstanding wind pressure on the balloon. The balloon is lashed to the probe by ropes adhered to the outer surface of the balloon for withstanding wind pressures of 100 miles per hour. Preferably, the coolant is liquid sodium-potassium eutectic alloy which will not normally freeze at night in the temperate zones, and when heated to 4,000° R exerts a pressure of only a few atmospheres.

23 Claims, 1 Drawing Figure

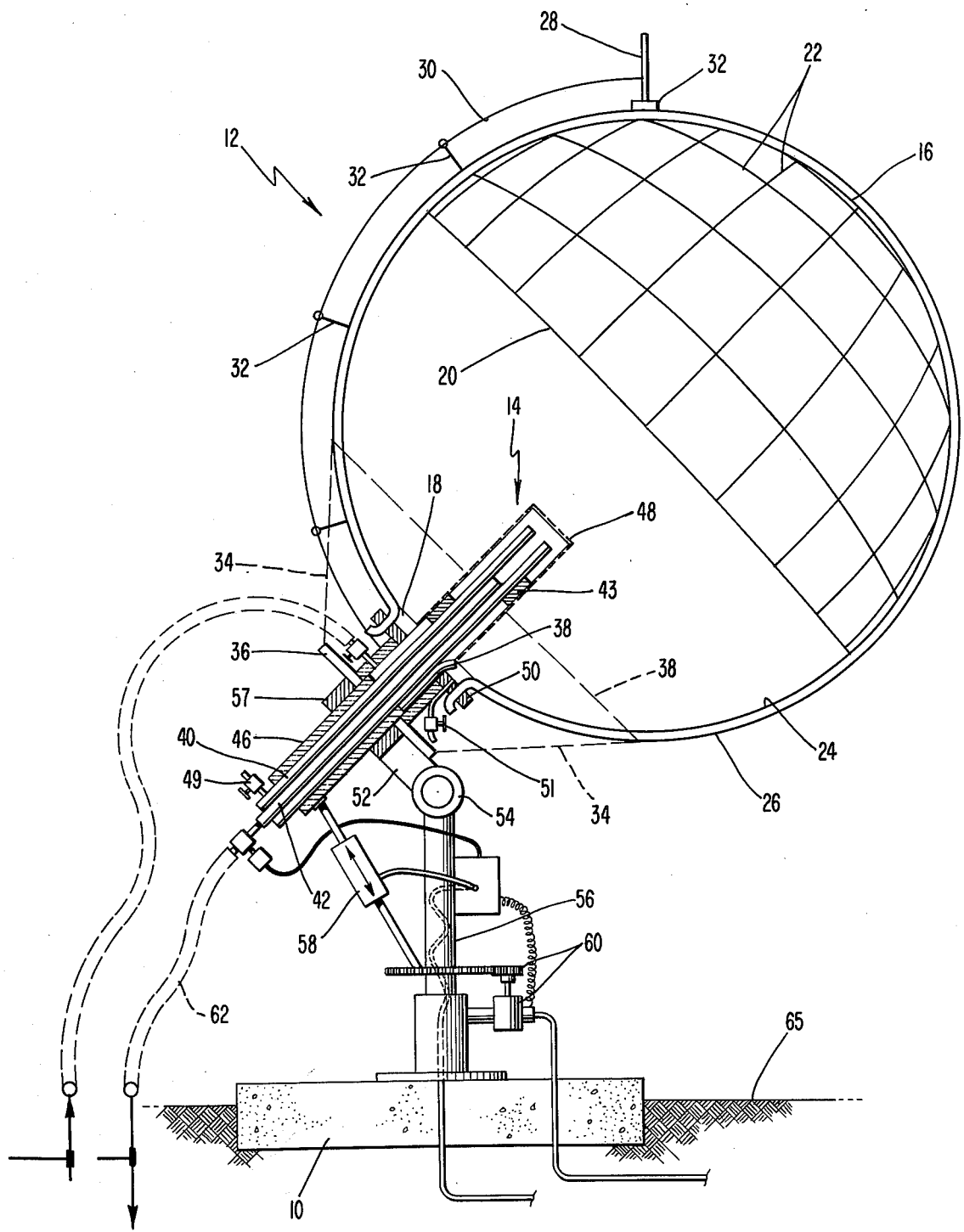

SOLAR ENERGY COLLECTOR INCLUDING A WEIGHTLESS BALLOON WITH SUN TRACKING MEANS

SUMMARY OF THE INVENTION

The invention is a solar energy collector having a weightless balloon comprising, in combination, a base; a spherical, reinforced plastic balloon having a substantially transparent hemisphere and an internally reflective hemisphere, the balloon being inflated with a lighter-than-air gas making it substantially weightless. A multi-tube boiler probe is hermetically secured in an opening in the balloon, the opening being substantially centrally located in the reflective hemisphere. A portion of the probe is outside the balloon and a portion of the probe extends into the balloon at the focus of sunlight reflected from the reflective hemisphere. Means are provided for conducting coolant to and from the probe, the coolant entering and exiting the portion of the probe outside the balloon and circulating within the tubes of the probe through the portion of the probe in the balloon and the coolant being heated within the probe by direct and reflected sunlight striking the probe. Means are also provided for securing the balloon and probe to the base, the securing means including means for tilting and rotating the balloon relative to the base to maintain the balloon in a predetermined orientation with the sun for optimum transmission of sunlight through the transparent hemisphere to the reflective hemisphere.

The transparent hemisphere of the balloon of the collector is a clear, weather- and ultra-violet light-resistant polyvinylfluoride film reinforced with a mesh of ropes adhesively secured to the outside surface of the transparent hemisphere. The reflective hemisphere is a laminate of two plastic films, the inner film being clear and ultra-violet light resistant and its outside surface being aluminized; the outer film being white, opaque and weather-resistant. The outside surface of the reflective hemisphere is reinforced with a fine mesh-woven cloth adhesively secured to the outside surface.

The collector probe comprises three concentric tubes, the inner tube defining a conduit for coolant fluid heated by the sun, the annular space between the outer and intermediate tubes being in fluid-flow communication with the inner tube and providing a conduit for coolant fluid to be heated, and the annular space between the inner and intermediate tubes being sealed and evacuated to provide vacuum insulation against convective heat transfer between heated coolant fluid in the inner tube and coolant fluid in the outer tube.

The balloon of the collector has a diameter up to 800 feet.

The balloon of the collector is inflated with a lighter-than-air consisting of a mixture of 92 to 95% nitrogen and 8 to 5% hydrogen to a pressure approximately equal to five inches of water.

The accompanying drawings, which are incorporated in and constitute a part of this specification, illustrate one embodiment of the invention and, together with the description, serve to explain the principles of the invention.

BRIEF DESCRIPTION OF THE DRAWING

The single FIGURE is a cross-sectional side view of the collector of the invention.

DESCRIPTION OF THE PREFERRED EMBODIMENT

In accordance with the claimed invention, the collector comprises a base, a spherical, reinforced plastic balloon, a multi-tubed probe, means for conducting coolant fluid to and from the probe, and means for securing the balloon and probe to the base including means for tilting and rotating the balloon relative to the base. Each of these basic components of the collector will now be discussed in detail.

Balloon Type Collector-Reflector

A weather resistant reinforced plastic balloon 12 would be used. The balloon 20 would be spherical, have two hemispheres 16 and 18 and balloon equator 20 would be at right angles to the axis of a probe 14. Upper hemisphere 16 nearest to sun would be of four-mil thick, polished, water clear, weather resistant, ultra violet light resistant, polyvinyl-fluoride (Tedlar) film or equal. Upper hemisphere 16 skin would be reinforced by a mesh of Kevlar yarns or equal woven into ropes 22 and adhered to skin using weather resistant, ultra violet light resistant adhesive. Ropes 22 would be on 12 to 18-inch centers and designed to resist 100 mile-per-hour wind forces. Solar light rays would enter balloon 12 through clear skin with rays parallel to probe axis. Incoming light transmission would be close to 85% with 14% loss due to reflection from surfaces of clear skin and 1% loss due to blockage by rope 22 mesh reinforcement.

Lower hemisphere 18 away from sun would be a 4-mil thick laminate consisting of two plastic films. Inner film 24 would be of two-mil thick, water clear, ultra violet light resistant Mylar or equal with heavily aluminized outer surface away from sun. Outer film 26 would be of 2-mil thick, opaque white, weather resistant Tedlar or equal. These two films would be press-rolled against a relatively fine mesh cloth (not shown) woven of 1000 Denier Kevlar yarns pretreated with ultra violet light resistant adhesive and designed to resist 100 mile-per-hour wind forces. Incoming light rays would pass through Mylar film and be reflected into probe 14. Aluminized surface of Mylar inner film 24 backed by opaque white Tedlar would block and reflect essentially all incoming light toward probe 14 except 4% which would be reflected from inner Mylar surface but which will also be directed into probe 14.

All balloon skin panels will be close to 6.28 feet wide and seams will be concentric circles parallel to equator to reduce skin material wastage and balloon skin assembly labor to an absolute minimum. Seams 20 would be butt-type using 2-inch wide tapes inside and out of 2-mil thick, clear Tedlar tape reinforced with Kevlar yarn cloth and pretreated with weather and ultra violet light resistant, pressure-sensitive adhesive or equal. Balloon 12 would be inflated with probe 14 temporarily in a vertical direction using nitrogen separated from ambient air using a cryogenic separator. Balloon 12 fill pressure would be 5 inches of water to prevent surface billowing when wind stagnation point velocity is 100 miles per hour. About 5% of the nitrogen would be withdrawn and replaced with hydrogen to make balloon and its tether cables weightless. The resulting 95-5 nitrogen-hydrogen gas mixture in balloon would have a density of close to 0.068 pounds per cubic foot and is not flammable. Once balloon is properly filled it can be aimed away from vertical without imposing an overturning moment against its own foundation. Balloon 12 of large diameter would require a top-mounted lightning rod 28 and grounding lead 30, separated from the balloon 12 by dielectric standoffs 32, plus small aircraft warning lights.

Rope Tethers Against Wind Forces

Kevlar yarns or equal used to make rope 34 would be 1000 Denier and each yarn would be of 666 Aramid fibers and have a design breaking pull of 60 pounds. Yarns used to make reinforcement meshes would have a design pull of 42 pounds each and are held in place against balloon skin as described above. Yarns used to make rope fingers and rope tether cables would be de-rated 50% to a design pull of 21 pounds each to allow for wear and tear and continuous flexing as wind forces vary. Probe 14 would extend into balloon 12 for a distance equal to 7/16 of balloon radius. Probe 14 would extend outside of balloon 12 to a rope tether cable anchoring ring 36 located at a distance of close to balloon diameter divided by the square root of three from balloon center.

Tether vang pads at balloon surface would be located on a tethering diameter 38 of one-half of balloon diameter. Kevlar rope fingers attached to balloon skin at 15-inch centers would converge in groups of five to join balloon end of Kevlar rope tethering cables 34 at a distance of 6.28 feet from balloon 12 surface. Tether rope cables 34 would be at close to 6.28 feet on centers at balloon ends and any half of them would be designed to resist 100 mile-per-hour wind forces in tension based on a drag factor of 0.4 and a lift factor of 0.2. Wind forces would be transferred to a tether anchoring ring 36 mounted on probe 14 and transverse to probe axis. Overall length of a tether rope cable 34 and its fingers would be close to balloon radius divided by the square root of three. When deployed, tether cables 34 will be at an angle of 60° with respect to axis of probe 14. Tether connectors at tether ring 36 will be adjustable to permit accurate deployment of balloon. Tether ring 36 will be braced stiffly to probe barrel using cones of thin-walled carbon steel plate.

Multi-tubed Probe for Converting Solar Light to Heat

Probe 14 would consist of three tubes 38, 40, 42 manufactured to boiler tube dimensions which will allow a wide selection of sizes. Nominal thickness of tubes will be ⅛ inch and construction will be all-welded except occasional ceramic wedges would be used to center tubing and transmit structural loading as to allow probe to resist bending as a unit. Inner tube 42 would be a flow passage for coolant removing heat from the probe 14. The annular space between the inner tube 42 and intermediate tube 40 would be evacuated to a hard vacuum pressure low enough to eliminate convective heat transfer between these two tubes. The occasional ceramic wedges 43 will block conductive heat transfer except at outer end 44 of probe 14 nearest sun where there is no temperature difference. The annular space between the intermediate tube 40 and the outer tube 38 would be a flow passage for coolant arriving to pick up heat from the outer tube 38 where conversion of solar light to thermal heat will take place. A small amount of heat will be lost from the inner tube 42 to the intermediate tube 40 in the vicinity of probe entry through balloon surface. All such losses will be picked up by arriving coolant and recycled. At very high collection temperatures this effect would be minimized by adding from 10 to 30 wraps of superinsulation with aluminized Mylar bright side aimed at hotter intermediate tube.

Outer tube 38 for large collectors would have its exterior surface treated to preferentially absorb solar light and allow a maximum conversion to heat captured in tube metal while minimizing re-emission heat losses below those of a perfect black body. This generally has been done by coating a metal with a thin layer of metal-oxide 48 and improvements by a factor of ten can be expected. With respect to this invention no claim is made as to selective surfaces except that best commercially available techniques would be used. It is not precluded that at very high collection temperatures novel techniques may be desirable or even necessary to prevent excessive losses due to re-emission but this Petition does not attempt to describe such future techniques.

Portion of probe outside of balloon will be provided with insulation 46 to minimize heat losses to ambient and prevent overheating of balloon skin or tether cables. At very high temperatures some of this insulation 46 would have to be ceramic. In such cases a bright metal collar 50 curved to balloon surface shape would be affixed to probe 14 using soft metal seals and have attached back side finning to dissipate heat and temperature to point where affixment of balloon reflective skin can be effected using means that are reasonable at close to ambient temperature. A balloon fill valve 51 is provided in the collar 50 to provide means for inflating the balloon 12. Probe tubing would be weather-resistant carbon steel to 800° R., low carbon austenitic stainless steel to 1600° R., 5% iron content superalloy to 2,400° R., rhodium clad molybdenum to 3,200° R. and tantalum clad sintered tungsten at higher temperatures. At very high collection temperatures probes 14 may tend to go limp and trussings of stainless wire pulled tight over ceramic or finned stainless steel stand-offs could be used to insure probe 14 stability. Probe coolant can be any fluid suited to the intended service. At higher temperatures sodium-potassium alloy (NAK) at close to its eutectic point could be used. This would preclude freeze-ups in normal night climates and would allow very high temperature heat pickup without mandating high pressures which in turn could require very a thick-walled probe. A thick-walled probe would be inappropriate for both structural design and cost considerations.

The probe 14 also has an inlet port 47 in fluid-flow communication with the annular space between the outer tube 38 and the intermediate tube 40 and an outlet port 51 in fluid-flow communication with the interior of the inner tube 42 providing means for coolant fluid flow into and out of the probe 14. The probe also includes a vacuum port 49 in fluid-flow communication with the annular space between the intermediate tube 40 and the inner tube 42 for evacuating the annular space.

Tracking Mount to Support Probe and Continuously Aim it at Sun

Such Mounts exist and have been used to support solid radar dishes of modest dimensions or larger radar dishes of more open design. Swivel-shaft 52 diameter must resist full wind forces in shear. Swivel shaft 52 location must allow raising of probe 14 to zenith to facilitate inflation of balloon 14 and also permit its location and use at the equator of our planet. Swivel shaft bearing journal bracing 54 must transmit wind force from tether anchoring ring 36 to horizontal mount support ring or vertical shaft 56 without undue deflection or quiver amplitudes. A probe support collar 57 is secured on the end of the swivel shaft 52 for attaching the probe 14 to the swivel shaft 55. Probe tilt would be accomplished using a hyraulic cylinder 58 with positioneer capable of being manually set and operated automatically. Pistons would be provided with mechanical stops and alarm actuating contacts to prevent disastrous tiltings. Horizontal mount drives 60 would be reversing, geared clock motors. Geared track would be provided with mechanical stops to prevent winding up coolant flexible hose 62 connections as well as automatic alarms and manual overrides. Horizontal track would be caged to prevent overturn and transmit wind forces to a reinforced concrete base 10. Mount arrangement would be as close to grade as practical to minimize wind force moment arms. Tracking mounts would be fabricated of weather resistant carbon steel and cast iron parts or better to insure long, trouble-free operation in all varieties of climate.

Concrete Base to Anchor Balloon Against Wind Forces and Support the Tracking Mount Slab thickness of concrete base 10 would be a minimum of three feet to allow it to be economically reinfoced to act as a beam in any direction. For collectors of very large diameter a truncated cone of reinforced concrete would be located at the middle of the concrete base to transmit large wind forces into the ground 65 in a reasonable manner while minimizing requirements for tracking mount carbon steel weldments. Concrete base 10 diameter and its reinforcement would be designed to bring resultant force into the ground 65 within a circle having a diameter of concrete base diameter divided by three to prevent excessive soil pressures at concrete base rim. Where local ground conditions are particularly poor or unstable, rings of sheeting or piles would be provided.

Source of Low Voltage 60 Hz Electrical Power to Energize Tracking Mount Drive Motors Such a power source is readily available from local utility company distribution lines, the housepower bus of a solar energy thermal electric plant, a small fuel cell or battery-powered invertor unit or a small gas-fired engine generator set.

Instrumentation & Controls to Permit Parallel Operation of Groups of Collectors Present materials tend to limit balloon diameters to 800 ft. or less. At a collection temperature of 2,400° R. to 3,200° R. such a collector could collect close to 36 MWt when sun is shining. This heat source could power thermal cycle or cycles generating from 15 MWe to 22 MWe using the best modern equipment. Sunlight at best is available about one-third of time. Thus a solar plant of size would require a number of 800-foot diameter collectors. Such farms of solar energy collectors would be provided with instrumentation and controls to permit parallel operation. Based on recent development of solid-state mini-computers this requirement would have a minimal overall plant cost impact.

Thermally Insulated Flexible Metal Coolant Hose Connections Between Probe and Extraneous Recirculated Coolant Piping System Supply and Return Mains Such hose 62 connections would be provided to supply cool coolant to probe 14 and receive hot coolant from probe 14 in order to make the transition between the tracking mount which constantly moves either east to west or west to east and the stationary coolant supply-and-return mains. All components of the extraneous coolant system are commercially available or would be simple extrapolations to higher service temperature operation. At very high service temperatures heat would be transferred to thermal power cycle vapor or condensate using very compact platefin-type heat exchangers which would result in low cost heat exchange as compared to fossil-fuel fired boilers which inherently require large banks of thick-walled tubing to receive heat from flue gas at very low overall U factors.

I claim:

1. A solar energy collector having a weightless balloon, comprising, in combination:
    (a) a base;
    (b) a spherical, reinforced plastic balloon having a substantially transparent hemisphere and an internally reflective hemisphere, said balloon being inflated with a lighter-than-air gas making the balloon substantially weightless;
    (c) a multi-tube boiler probe hermetically secured in an opening in said balloon, said opening being substantially centrally located in the surface of said reflective hemisphere and the longitudinal axis of said probe being substantially normal to the plane of the balloon equator defined between the two hemispheres, a portion of said probe being outside said balloon, and a portion extending into said balloon at the focus of sunlight reflected from said reflective hemisphere;
    (d) means for conducting coolant to and from said probe, said coolant entering and exiting the portion of said probe outside said balloon and circulating within the tubes of said probe through the portion of the probe in the balloon, said coolant being heated within said probe by sunlight striking the probe; and
    (e) means for securing said balloon and probe to said base, said securing means including means for tilting and rotating said balloon relative to said base to maintain said balloon in a predetermined orientation with the sun for optimum transmission of sunlight through said transparent hemisphere to said probe and said reflective hemisphere.

2. The collector of claim 1 wherein said transparent hemisphere of said balloon is clear, weather and ultraviolet light resistant polyvinylflouride film reinforced with a mesh of ropes adhesively secured to the outside surface of the transparent hemisphere.

3. The collector of claim 1 wherein said reflective hemisphere of said balloon is a laminate of two plastic films, the inner film being clear and ultra-violet light resistant and its outside surface being aluminized, and the outer film being white opaque and weather-resistant, the outside surface of the reflective hemisphere being reinforced with a fine mesh woven cloth adhesively secured to the outside surface.

4. The collector of claim 1 wherein said probe comprises three concentric tubes, the inner tube defining a conduit for coolant fluid heated by the sun, the annular space between the outer and intermediate tubes being in fluid-flow communication with the inner tube and providing a conduit for coolant fluid to be heated, and the annular space between the inner and intermediate tubes being sealed and evacuated to provide vacuum insulation against convective heat transfer between heated coolant fluid in the inner tube and coolant fluid in the outer tube.

5. The collector as in claim 1 wherein the tubes are separated and supported by ceramic wedges which also reduce conductive heat transfer.

6. The collector as in claim 1 wherein said coolant is a liquid sodium-potassium alloy which remains liquid at normal night temperatures and has minimal pressure increase at very high temperatures.

7. The collector as in claim 1 wherein the outer surface of the portion of said probe projecting into said balloon is coated with a selective surface for preferential absorption of solar light.

8. The collector as in claim 1 wherein the outer surface of the portion of said probe outside said balloon is insulated to minimize heat loss.

9. The collector as in claim 4 wherein said probe is weather-resistant carbon steel.

10. The collector as in claim 4 wherein said probe is low carbon austenitic stainless steel.

11. The collector of claim 4 wherein said probe is 5% iron content superalloy.

12. The collector of claim 4 wherein said probe is rhodium clad molybdenum.

13. The collector of claim 4 wherein said probe is tantalum clad sintered tungsten.

14. The collector of claim 1 wherein said means for securing said balloon and probe to said base includes rope tethers being attached to one end to points on the balloon surface, the attachment points being located on and spaced around a tethering diameter equal to approximately one-half the balloon diameter, the other ends of said rope tethers being attached to the portion of said probe outside said balloon.

15. The collector of claim 14 wherein the balloon attachment end of each rope tether is divided into a plurality of rope fingers, each being attached to the balloon surface at the tethering diameter.

16. The collector as in claim 14 also including a tether ring rigidly attached to the portion of the probe outside said balloon said rope tethers being attached to said tether ring.

17. The collector as in claim 16 wherein said securing means includes a vertical shaft rotatably attached to said base for rotation around its longitudinal axis, a swivel shaft pivotally attached to said vertical shaft remote from said base, means for attaching said probe to said swivel shaft, gear means for rotating said vertical shaft, and piston means for tilting said swivel shaft.

18. The collector as in claim 17 wherein said tether ring is mounted proximate said swivel shaft and said swivel shaft transmit forces on said tether ring to said vertical shaft and said base without undue deflection or quiver.

19. The collector as in claim 1 wherein said balloon has a diameter up to 800 feet.

20. The collector as in claim 1 wherein said lighter-than-air gas is a mixture of 92 to 95% nitrogen and 8 to 5% hydrogen.

21. The collector as in claim 1 wherein said balloon is inflated to a pressure approximately equal to five inches of water.

22. A solar energy collector having a weightless balloon, comprising, in combination:
(a) a base;
(b) a vertical shaft, one end being rotatably attached to said base for rotation about the longitudinal axis of said shaft;
(c) gear and motor means for rotating said vertical shaft;
(d) a swivel shaft pivotally attached to the other end of said vertical shaft, said swivel shaft being moveable in one plane of the longitudinal axis of said vertical shaft;
(e) a multi-tube probe having first and second sections rigidly attached to said swivel shaft at the first section of said probe, the longitudinal axis of said probe being normal to the longitudinal axis of said swivel shaft, said probe comprising:
  (1) a first outer tube;
  (2) a second intermediate tube concentric with said first tube defining a first annular space between said first and second tubes;
  (3) a third inner tube concentric with said second tube defining a second annular space between said second and third tubes and defining a third space within said third tube, said second annular space being sealed and said third space being in fluid flow communication with said first annular space in the second section of said probe;
  (4) ceramic wedges separating and supporting said first, second and third tubes;
  (5) an inlet port in the first section of said probe in fluid flow communication with said first annular space;
  (6) an outlet port in the first section of said probe in fluid flow communication with said third space;
  (7) a vacuum port in the first section of said probe in fluid flow communication with said sealed second space;
  (8) a solar-light selective coating on the outside surface of the second section of said probe;
  (9) heat transfer insulation substantially covering the outside surface of said first section of said probe; and
  (10) a tether ring rigidly attached to the firsst section of said probe and proximate said swivel shaft, said swivel shaft transmitting forces from said tether ring to said vertical shaft and said base;
(f) hydraulic piston means acting between said vertical shaft and the first section of said probe for moving said swivel shaft and probe;
(g) means for controlling said gear and motor means and said hydraulic piston means;
(h) a spherical, reinforced plastic balloon, comprising:
  (1) a first hemisphere being of clear, weather and ultra-violet light resistant, polyvinylflouride film;
  (2) a rope mesh adhesively secured to the outside surface of said first hemisphere for reinforcement;
  (3) a second hemisphere being a laminate of two plastic films, the inner film being clear and ultra-violet light resistant and having its outside surface covered with a coating of aluminum for reflecting sunlight into said balloon, and the outer film being white, opaque and weather-resistant, said second hemisphere having an opening for hermetically securing said balloon to said probe, the first section of said probe being outside said balloon and the second section extending inside said balloon at the focus of sunlight reflected from said second hemisphere; and (4) a balloon fill valve in fluid flow communication with the inside of said balloon for filling said balloon with a lighter-than-air gas, such that, when inflated, said balloon is subtantially weightless;

(i) a plurality of tether ropes one end of each being attached to said tether ring and the other end of each being attached to an attachment point on the outside surface of said balloon, the attachment points being spaced around said balloon on a tether diameter being equal to approximately one-half balloon diameter; and (j) weather and ultra-violet light resistant plastic sheaths covering said tether ropes.

23. The collector of claim 22 also including a lightning rod secured to the top of said balloon and separated from the balloon surface by a dielectric separator, and a grounding wire connecting said lightning rod to said probe and being spaced from said balloon surface by dielectric stand-offs.

* * * * *